(12) United States Patent
Noda et al.

(10) Patent No.: US 12,536,120 B2
(45) Date of Patent: Jan. 27, 2026

(54) DATA LINKING METHOD AND COMPUTER-READABLE RECORDING MEDIUM STORING DATA LINKING PROGRAM

(71) Applicant: Fujitsu Limited, Kawasaki (JP)

(72) Inventors: Masahide Noda, Kawasaki (JP); Zhaogong Guo, Koto (JP); Tomoharu Imai, Kawasaki (JP); Masashi Kunikawa, Kawasaki (JP); Koichi Yokota, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/737,252

(22) Filed: Jun. 7, 2024

(65) Prior Publication Data
US 2025/0028667 A1   Jan. 23, 2025

(30) Foreign Application Priority Data

Jul. 19, 2023 (JP) ................................. 2023-117485

(51) Int. Cl.
*G06F 13/40* (2006.01)
*G06F 30/20* (2020.01)

(52) U.S. Cl.
CPC .......... *G06F 13/4022* (2013.01); *G06F 30/20* (2020.01)

(58) Field of Classification Search
CPC ............................ G06F 13/4022; G06F 30/20
See application file for complete search history.

(56) References Cited

U.S. PATENT DOCUMENTS

| | | | |
|---|---|---|---|
| 2010/0146225 A1 | 6/2010 | Biehler et al. | |
| 2011/0320718 A1 | 12/2011 | Szakacsits | |
| 2018/0075059 A1 | 3/2018 | Chen et al. | |
| 2020/0285788 A1 | 9/2020 | Brebner | |
| 2021/0287459 A1* | 9/2021 | Cella | G07C 5/0808 |
| 2021/0325198 A1* | 10/2021 | Chen | H04W 4/029 |
| 2022/0191648 A1 | 6/2022 | Smith et al. | |
| 2022/0253321 A1* | 8/2022 | Iida | G16Z 99/00 |

(Continued)

FOREIGN PATENT DOCUMENTS

| | | |
|---|---|---|
| JP | 2013-533551 | 8/2013 |
| JP | 2023-005741 | 1/2023 |

OTHER PUBLICATIONS

EESR—Extended European Search Report dated Dec. 12, 2024 for corresponding European Patent Application No. 24181941.6 [10 pages].

*Primary Examiner* — Henry Tsai
*Assistant Examiner* — Aurangzeb Hassan
(74) *Attorney, Agent, or Firm* — Fujitsu Intellectual Property Center (57) ABSTRACT

A data linking method, between a first digital twin system and a second digital twin system, to be executed by a connector disposed as a computer between an application program that belongs to a same group as the first digital twin system and the second digital twin system that belongs to a group different from the first digital twin system, includes: performing switching between a first reading mode and a second reading mode based on a relationship between a request interval at which the application program requests data from the connector and an update interval of the second digital twin system that serves as a reading destination of the data by the connector.

7 Claims, 11 Drawing Sheets

(56) References Cited

U.S. PATENT DOCUMENTS

| | | | |
|---|---|---|---|
| 2023/0128173 A1* | 4/2023 | Sha ................... | G06F 11/3628 703/21 |
| 2023/0195066 A1* | 6/2023 | Ramanasankaran ... | G05B 15/02 700/28 |
| 2024/0144576 A1* | 5/2024 | Aizawa ................ | G08G 5/26 |

* cited by examiner

| VEHICLE ID | LATITUDE | LONGITUDE | COLLECTION DATE AND TIME |
|---|---|---|---|
| CR1 | Px1 | Py1 | 06/26/23 11:30:12 |
| CR2 | Px2 | Py2 | 06/26/23 11:45:30 |
| : | : | : | : |
| CRn | Pxn | Pyn | 06/26/23 11:58:01 |

FIG. 5A

| PROPERTY ID | REQUEST INTERVAL ($\Delta Tr$) | UPDATE INTERVAL ($\Delta Ts$) | READING MODE |
|---|---|---|---|
| VEHICLE POSITION OF SECOND DIGITAL TWIN SYSTEM | 180 SECONDS | 60 SECONDS | EACH-TIME READING MODE ($\Delta Tr > 2*\Delta Ts$) |
| TRAVELING DISTANCE OF SECOND DIGITAL TWIN SYSTEM | 180 SECONDS | 120 SECONDS | PRE-READING MODE ($\Delta Tr \leq 2*\Delta Ts$) |
| VEHICLE POSITION OF THIRD DIGITAL TWIN SYSTEM | 300 SECONDS | 120 SECONDS | EACH-TIME READING MODE ($\Delta Tr > 2*\Delta Ts$) |

FIG. 5B

| SECOND DIGITAL TWIN SYSTEM | | | |
|---|---|---|---|
| PROPERTY ID | REQUEST INTERVAL ($\Delta Tr$) | UPDATE INTERVAL ($\Delta Ts$) | READING MODE |
| VEHICLE POSITION | 180 SECONDS | 60 SECONDS | EACH-TIME READING MODE ($\Delta Tr > 2*\Delta Ts$) |
| TRAVELING DISTANCE | 180 SECONDS | 120 SECONDS | PRE-READING MODE ($\Delta Tr \leq 2*\Delta Ts$) |

EACH-TIME READING MODE
($\Delta Tr > 2 * \Delta Ts$)

DATA LINKING METHOD AND COMPUTER-READABLE RECORDING MEDIUM STORING DATA LINKING PROGRAM

CROSS-REFERENCE TO RELATED APPLICATION

This application is based upon and claims the benefit of priority of the prior Japanese Patent Application No. 2023-117485, filed on Jul. 19, 2023, the entire contents of which are incorporated herein by reference.

FIELD

The embodiment discussed herein is related to a data linking method and a data linking program.

BACKGROUND

A distributed simulation system in which a plurality of simulators are coupled to each other is known. The distributed simulation system includes, for example, a system in which a large number of sub-simulators are linked by a network for the purpose of improving calculation capacity in a simulation. For example, the distributed simulation system may be a system in which simulators operated by individuals to execute a virtual simulation in which a large number of individuals participate are linked by a network.

Japanese Laid-open Patent Publication No. 2023-005741 is disclosed as related art.

SUMMARY

According to an aspect of the embodiments, a data linking method, between a first digital twin system and a second digital twin system, to be executed by a connector disposed as a computer between an application program that belongs to a same group as the first digital twin system and the second digital twin system that belongs to a group different from the first digital twin system, includes: performing switching between a first reading mode and a second reading mode based on a relationship between a request interval at which the application program requests data from the connector and an update interval of the second digital twin system that serves as a reading destination of the data by the connector.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Besides the distributed simulation system, for example, a digital twin system is known in which a real world is converted into data and the data is mapped to a virtual world, so that the virtual world is grasped and analyzed by looking down as data. The digital twin system collects a large amount of data from the real world that changes from hour to hour, and virtually constructs and reproduces a real society over a cyber space. By using the digital twin system, virtual cities, people, and events are reproduced, and it is possible to implement a large-scale simulation. For example, it is possible to implement congestion avoidance, efficient delivery, and the like by using position data of a large number of vehicles.

The digital twin system may be constructed in units of organizations. For example, the digital twin system may be constructed by each of a public organization and a private organization. Due to a difference in an organization between the digital twin systems of different organizations, it is often difficult to link data managed by each of the digital twin systems. As a result, an opportunity of using data mutually between the digital twin systems decreases.

For data linking in such a case where the organizations are different, a connector that supports data linking may be used. The connector is a software interface such as an application programming interface (API), and may be implemented by a computer. By using the connector, for example, an application program (hereafter, appropriately described as an application for short) belonging to the same organization as a digital twin system belonging to the public organization may acquire data of a digital twin system belonging to the private organization through the connector.

It is assumed that the connector reads data in one of two types of reading modes from the digital twin system during a period from when the application requests data from the connector to when the application acquires data from the connector. For example, a first reading mode is assumed in which the connector reads data from the digital twin system every time data is requested from the application. A second reading mode is assumed in which the connector first reads data from the digital twin system before data is requested from the application.

However, in a case where the first reading mode is used, since data is not prepared in the connector in advance, it may take time from when the application requests data from the connector to when the application acquires the data from the connector. By contrast, when the second reading mode is used, data is accumulated in the connector, and thus there is a risk that a storage resource (for example, a storable capacity) of the connector is insufficient.

Accordingly, in one aspect, it is an object to provide a data linking method and a data linking program that adaptively select a data reading mode.

An embodiment for carrying out the present disclosure will be described below with reference to the drawings.

Figure 1:
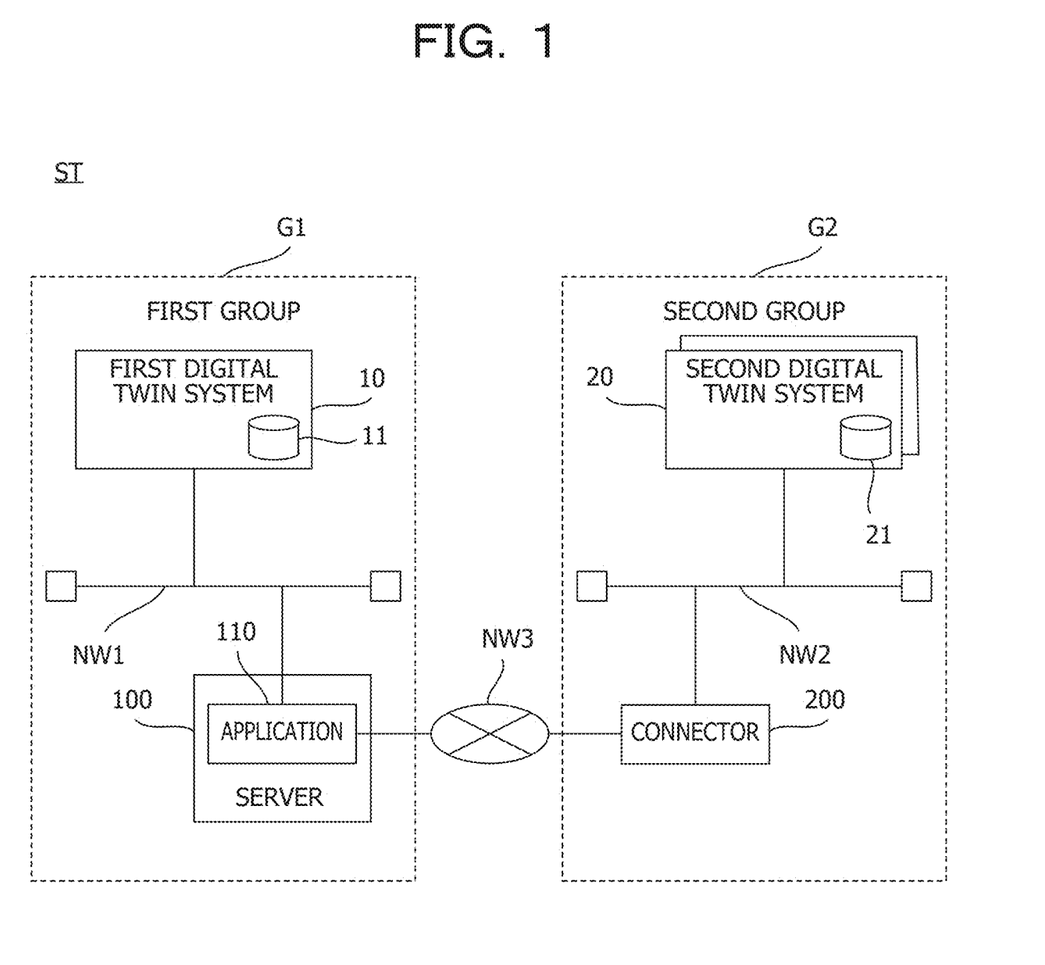
FIG. 1 is a diagram illustrating an example of a data linking system.

As illustrated in FIG. 1, a data linking system ST includes a first digital twin system 10, a second digital twin system 20, a server 100, and a connector 200. Both the first digital twin system 10 and the second digital twin system 20 are computer systems that collect a large amount of data from a real world that changes from hour to hour, and virtually construct and reproduce a real society over a cyber space.

Although details will be described later, for example, the second digital twin system 20 collects position data of a plurality of vehicles traveling in a certain area such as a city, and accumulates and manages the position data in a second database (DB) 21 included in the second digital twin system 20. Based on the position data managed in the second DB 21, the second digital twin system 20 virtually constructs and reproduces traveling states of the vehicles in the real society over the cyber space. Although not illustrated, the second digital twin system 20 may include a predetermined DB for managing traveling distances of the vehicles.

The server 100 includes an application 110. For example, the application 110 is installed in the server 100. The application 110 executes predetermined processing. For example, the application 110 calculates, as the predetermined processing, a carbon dioxide discharge amount discharged from the vehicles in the above-described area based on the position data of the vehicles. In a case where a vehicle is located on a road, it is assumed that the vehicle is traveling. In a case where a vehicle is located in a garage or a parking lot, it is assumed that the vehicle is stopped.

For this reason, in a case where it is determined that the vehicles are located on a road based on the position data and map data, the application 110 calculates the carbon dioxide discharge amount in the area by multiplying a unit discharge amount discharged by each vehicle by a number of vehicles located in that area. After calculating the carbon dioxide discharge amount, the application 110 stores and manages discharge amount data representing the carbon dioxide discharge amount in a first DB 11 included in the first digital twin system 10.

The first digital twin system 10 and the server 100 (for example, the application 110) are coupled to each other by a communication network NW1. The second digital twin system 20 and the connector 200 are coupled to a communication network NW2. The server 100 (for example, the application 110) and the connector 200 are coupled to each other by a communication network NW3. Accordingly, the application 110 may not directly access the second digital twin system 20 without via the connector 200.

Each of the communication networks NW1, NW2, and NW3 includes, for example, at least one of a local area network (LAN), a wide area network (WAN), and the Internet. For example, the communication networks NW1 and NW2 may be the LANs, and the communication network NW3 may be the Internet.

All of the first digital twin system 10, the server 100, and the communication network NW1 belong to a same first group G1. All of the second digital twin system 20, the connector 200, and the communication network NW2 belong to a same second group G2. However, the first group G1 and the second group G2 are different from each other.

For example, the first group G1 is a public organization or a public group, and the second group G2 is a private organization or a private group. For example, the first group G1 is a government or a ministry that manages the carbon dioxide discharge amount discharged by the vehicles. As described above, the discharge amount data representing the carbon dioxide discharge amount is accumulated and managed in the first DB 11 included in the first digital twin system 10. On the other hand, the second group G2 includes a business operator who manufactures and sells vehicles, a business operator who lends vehicles for a charge or for free of charge, or the like. The vehicles may be four-wheeled vehicles or two-wheeled vehicles including electric motor cycles and electric scooters. As described above, the position data representing the positions of such vehicles are accumulated and managed in the second DB 21 included in the second digital twin system 20.

As described above, in data linking (federation) between the first digital twin system 10 and the second digital twin system 20 in a case where the first group G1 and the second group G2 are different from each other, the connector 200 is used to improve a data use opportunity. The connector 200 includes a software interface such as an API, and may be implemented by a computer. By using the connector 200, the application 110 belonging to the first group G1 may acquire the position data of the second digital twin system 20 belonging to the second group G2 via the connector 200.

Figure 2:
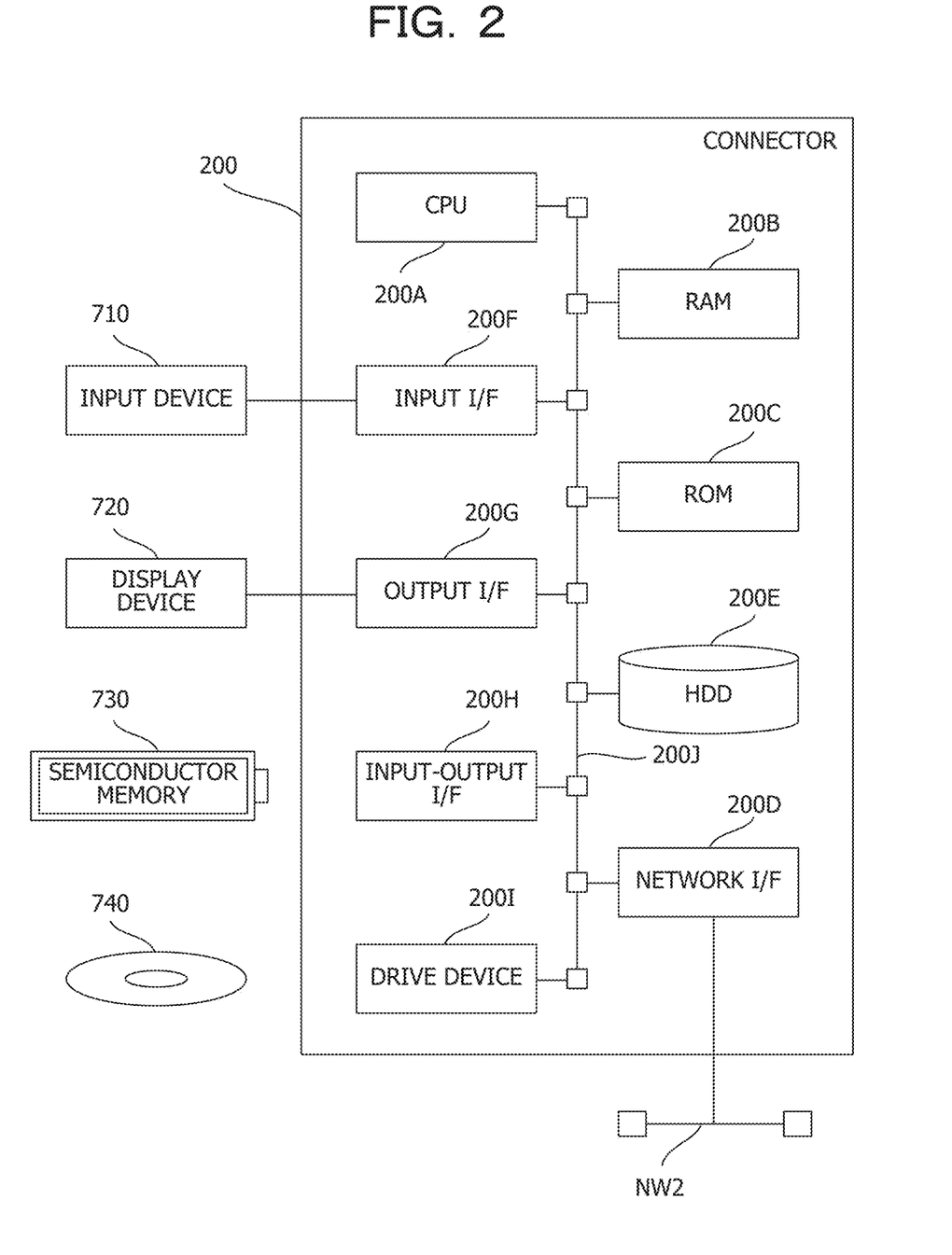
FIG. 2 is a diagram illustrating an example of a hardware configuration of a connector.

A hardware configuration of the connector 200 will be described with reference to FIG. 2 next. Hardware configurations of the first digital twin system 10, the second digital twin system 20, and the server 100 are basically similar to the hardware configuration of the connector 200, and thus detailed description thereof will be omitted.

The connector 200 includes a central processing unit (CPU) 200A as a processor, and a random-access memory (RAM) 200B and a read-only memory (ROM) 200C as memories. The RAM 200B includes a dynamic RAM (DRAM) and a static RAM (SRAM). The SRAM may be included in the CPU 200A. The connector 200 includes a network interface (I/F) 200D and a hard disk drive (HDD) 200E. The connector 200 may employ a solid-state drive (SSD) instead of the HDD 200E.

The connector 200 may include at least one of an input I/F 200F, an output I/F 200G, an input-output I/F 200H, and a drive device 200I as appropriate. The CPU 200A to the drive device 200I are coupled to each other by an internal bus 200J. For example, the connector 200 may be implemented by a computer.

An input device 710 is coupled to the input I/F 200F. Examples of the input device 710 include a keyboard, a mouse, a touch panel, and the like. A display device 720 is coupled to the output I/F 200G. Examples of the display device 720 include a liquid crystal display and the like. A semiconductor memory 730 is coupled to the input-output I/F 200H. Examples of the semiconductor memory 730 include a Universal Serial Bus (USB) memory, a flash memory, and the like. The input-output I/F 200H reads a data linking program stored in the semiconductor memory 730. For example, the input I/F 200F and the input-output I/F 200H include USB ports. For example, the output I/F 200G includes a display port.

A portable-type recording medium 740 is inserted into the drive device 200I. Examples of the portable-type recording medium 740 include removable discs such as a compact disc (CD)-ROM and a Digital Versatile Disc (DVD). The drive device 200I reads a data linking program recorded in the portable-type recording medium 740. For example, the network I/F 200D includes a LAN port, a communication circuit, or the like. The communication circuit includes any one or both of a wired communication circuit and a wireless communication circuit. The network I/F 200D is coupled to the communication network NW2.

The data linking program stored in at least one of the ROM 200C, the HDD 200E, and the semiconductor memory 730 is temporarily stored in the RAM 200B by the CPU 200A. The data linking program recorded in the portable-type recording medium 740 is temporarily stored in the RAM 200B by the CPU 200A. By executing the stored data linking program by the CPU 200A, the CPU 200A implements various types of functions described later and executes a data linking method including various types of processing described later. The data linking program may be a program corresponding to a flowchart to be described later.

Figure 3:
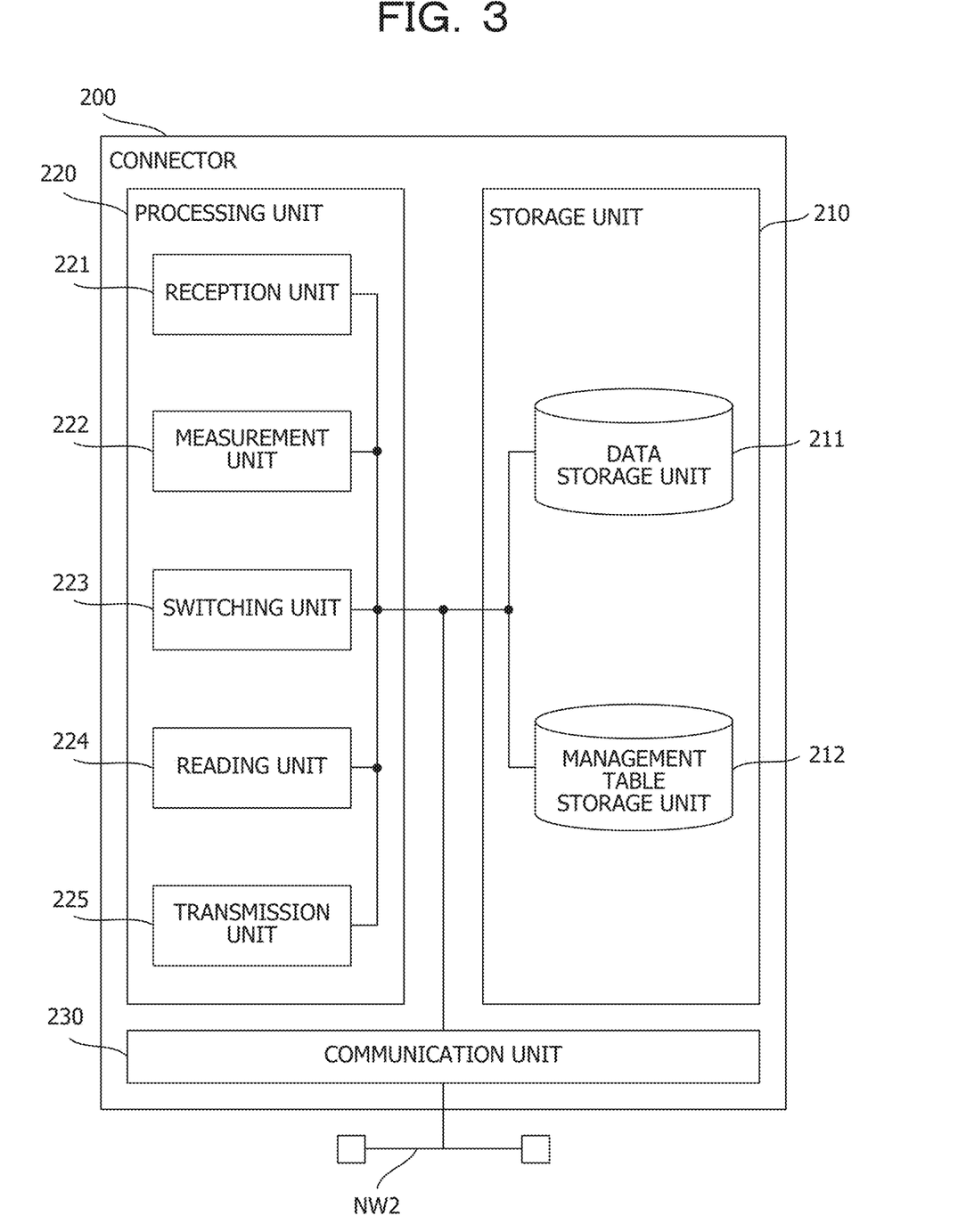
FIG. 3 is a diagram illustrating an example of a functional configuration of the connector.

The functional configuration of the connector 200 will be described with reference to FIGS. 3 to 6. FIG. 3 illustrates a main part of the functions of the connector 200.

As illustrated in FIG. 3, the connector 200 includes a storage unit 210, a processing unit 220, and a communication unit 230. The storage unit 210 may be implemented by any one or both of the RAM 200B and the HDD 200E described above. The processing unit 220 may be implemented by the CPU 200A described above. The communication unit 230 may be implemented by the network I/F 200D described above. The storage unit 210, the processing unit 220, and the communication unit 230 are coupled to one another. The storage unit 210 includes a data storage unit 211 and a management table storage unit 212. The processing unit 220 includes a reception unit 221, a measurement unit 222, a switching unit 223, a reading unit 224, and a transmission unit 225.

Figure 4:
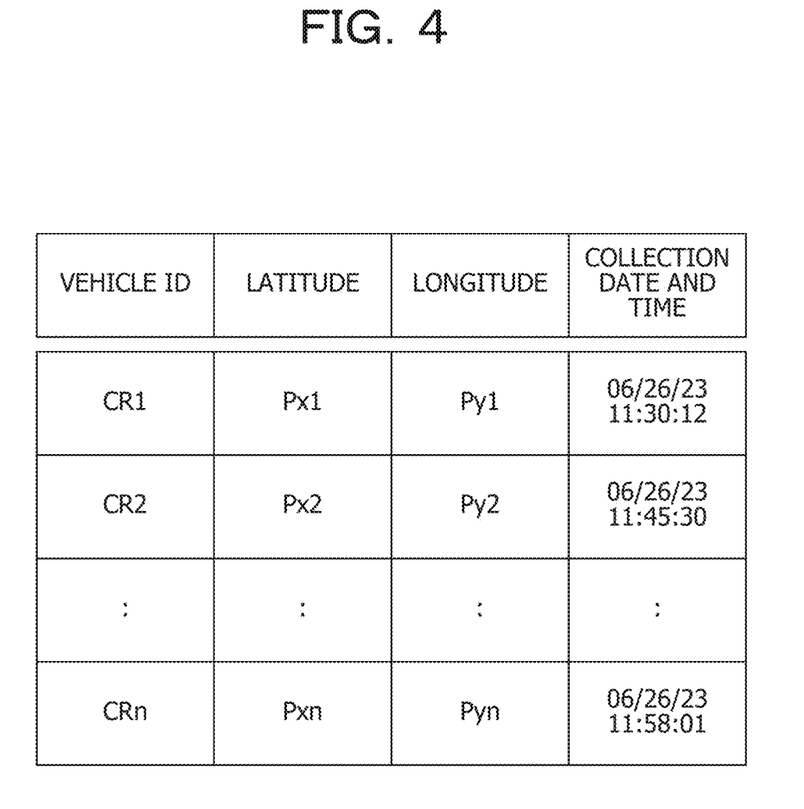
FIG. 4 is a diagram illustrating an example of position data.

The data storage unit 211 stores position data of a vehicle. As illustrated in FIG. 4, the position data has a plurality of items such as a vehicle identifier (ID), a latitude, a longitude, and a collection date and time, for example. Identification information representing an identifier of the vehicle is registered in the item of the vehicle ID. Latitude information representing a latitude at which the vehicle is located is registered in the item of the latitude. Longitude information representing a longitude at which the vehicle is located is registered in the item of the longitude. The date and time when the second digital twin system 20 collected the position data from the vehicle are registered in the item of the collection date and time. Although details will be described later, the data storage unit 211 stores position data published or responded from the second digital twin system 20.

Figure 5A:
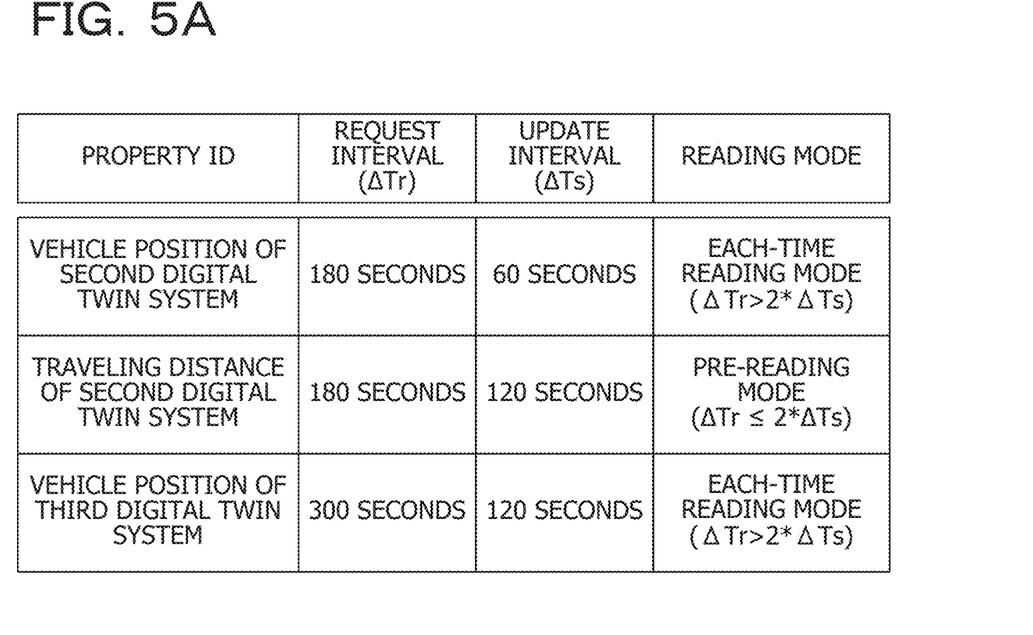
FIG. 5A is a diagram illustrating an example of a management table and FIG. 5B is a diagram illustrating another example of the management table.

The management table storage unit 212 stores a management table. The management table manages a reading mode when the connector 200 reads the position data from the second digital twin system 20. For example, as illustrated in FIG. 5A, the management table has a plurality of items such as a property ID, a request interval ($\Delta Tr$), an update interval ($\Delta Ts$), and a reading mode. For example, a combination of a digital twin system name of a reading destination and a reading target data name is registered in the item of the property ID. According to the combination registered in the item of the property ID, the connector 200 may specify, for example, the second digital twin system 20 that serves as the reading destination. According to the combination registered in the item of the property ID, the connector 200 may specify the position data of the vehicle as the reading target data, for example.

Figure 6:
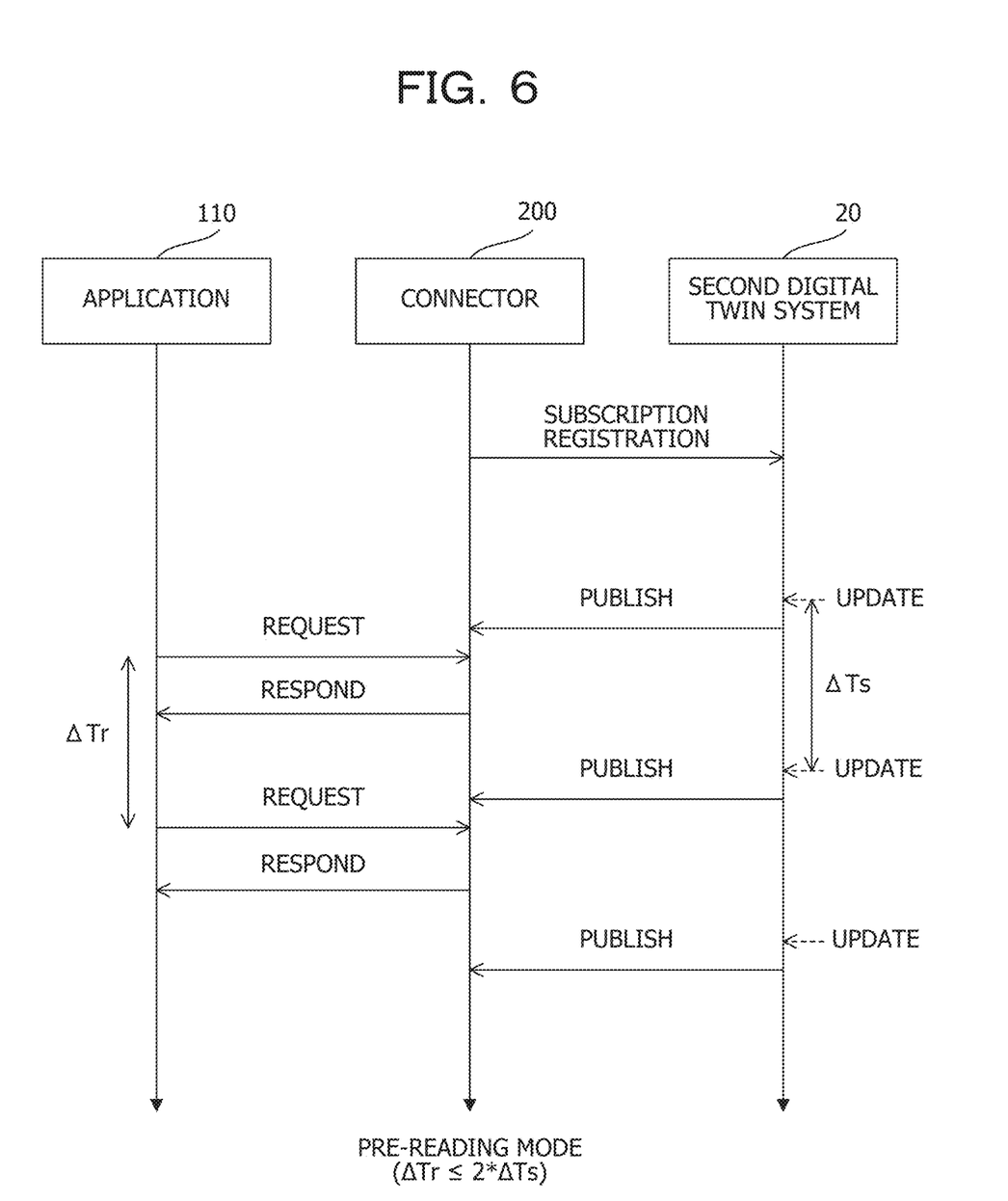
FIG. 6 is an example of a processing sequence diagram in a pre-reading mode.

An average of time intervals at which the application 110 requests data from the connector 200 is registered as a request interval $\Delta Tr$ in the item of the request interval. For example, as illustrated in FIG. 6, the application 110 periodically requests data from the connector 200 based on settings or non-periodically requests data from the connector 200 based on an operation of an administrator who manages the server 100. According to the present embodiment, the application 110 requests position data from the connector 200.

Every time a data request is received from the application 110, the connector 200 responds data to the application 110 and holds a reception date and time. After holding two consecutive reception dates and times, the connector 200 calculates the request interval $\Delta Tr$ based on a difference between the two reception dates and times. After calculating a plurality of request intervals $\Delta Tr$, the connector 200 calculates an average of the request intervals $\Delta Tr$ by dividing a total sum of the request intervals $\Delta Tr$ by the number of request intervals $\Delta Tr$, and manages the average of the request intervals $\Delta Tr$ by using the management table.

An average of time intervals at which the second digital twin system 20 is updated is registered as an update interval $\Delta Ts$ in the item of the update interval. For example, as illustrated in FIG. 6, when the connector 200 transmits a data subscription registration to the second digital twin system 20 in advance, the second digital twin system 20 continuously publishes data to the connector 200. For example, the second digital twin system 20 is updated every time the second digital twin system 20 collects position data from the vehicle, and the position data is continuously published to the connector 200 after a certain period of time (for example, several seconds or several milliseconds) elapses after the update is completed. When a time interval at which the second digital twin system 20 collects the position data from the vehicle is fixed, the second digital twin system 20 publishes the position data to the connector 200 at the fixed time interval. A model of data distribution and subscription registration in advance corresponds to, for example, a publish-subscribe type model.

Every time the connector 200 receives position data, the connector 200 holds a reception date and time. After holding two consecutive reception dates and times, the connector 200 calculates the update interval $\Delta Ts$ based on a difference between the two reception dates and times. After calculating a plurality of update intervals $\Delta Ts$, the connector 200 calculates an average of the update intervals $\Delta Ts$ by dividing a total sum of the update intervals $\Delta Ts$ by the number of the update intervals $\Delta Ts$, and manages the average of the update intervals $\Delta Ts$ by using the management table.

Returning to FIG. 5A, a reading mode in which the connector 200 reads data from the second digital twin system 20 is registered in the item of the reading mode. One of two types of reading modes is registered in the item of the reading mode. For example, based on a relationship between the average of the request intervals $\Delta Tr$ and the average of the update intervals $\Delta Ts$, one of an each-time reading mode and a pre-reading mode is registered in the item of the reading mode. The each-time reading mode is an example of a first reading mode. The pre-reading mode is an example of a second reading mode. Details of the each-time reading mode and the pre-reading mode will be described later. For example, when the average of the request intervals $\Delta Tr$ is larger than twice the average of the update intervals $\Delta Ts$, the each-time reading mode is registered in the item of the reading mode. When the average of the request intervals $\Delta Tr$ is equal to or smaller than twice the average of the update intervals $\Delta Ts$, the pre-reading mode is registered in the item of the reading mode.

Although a coefficient "2" is used as an example of a coefficient representing a multiplication ratio in the present embodiment, the coefficient is not particularly limited to "2" as long as the coefficient is larger than a coefficient "1" and equal to or smaller than the coefficient "2". By using a coefficient larger than the coefficient "1" and equal to or smaller than the coefficient "2", a time from when the application 110 requests position data from the connector 200 to when the application 110 acquires the position data from the connector 200 is shortened. By using the coefficient larger than the coefficient "1" and equal to or smaller than the coefficient "2", the application 110 acquires position data from the connector 200 before the position data is excessively accumulated in the connector 200. As a result, shortage of a storage resource (for example, a storable capacity) of the data storage unit 211 included in the connector 200 is suppressed.

Figure 5B:
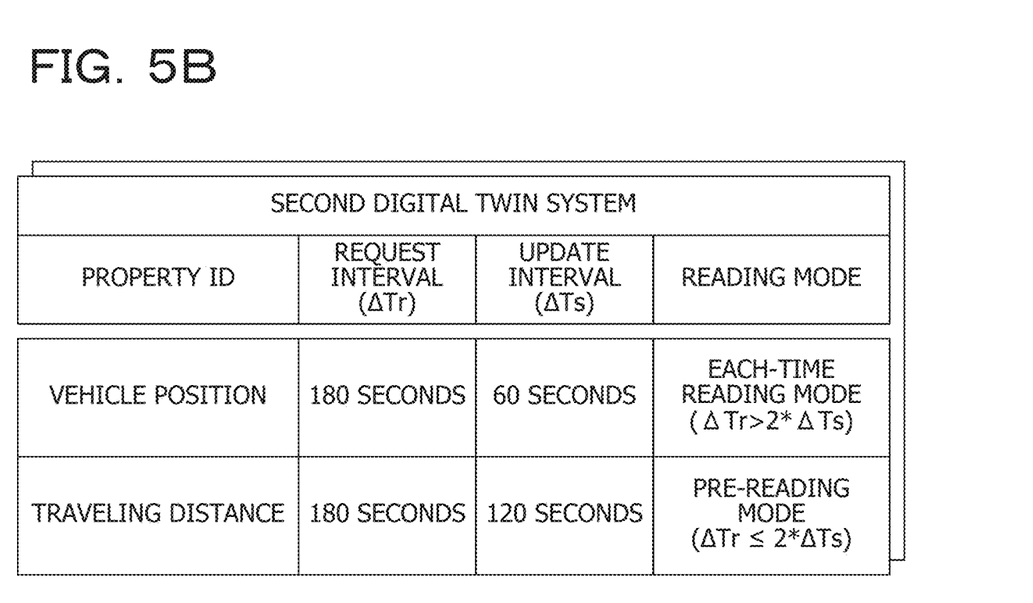

In the above-described embodiment, as an example, it has been described that the combination of the digital twin system name of the reading destination and the reading target data name is registered in the item of the property ID. However, as illustrated in FIG. 5B, the reading target data name may be registered alone in the item of the property ID. In this case, the management table storage unit 212 stores a plurality of management tables in units of digital twin system names.

Returning to FIG. 3, the reception unit 221 receives a data request transmitted from the application 110. The data request is message information for requesting the connector 200 to provide position data by the application 110. The reception unit 221 receives the position data published from the second digital twin system 20.

The measurement unit 222 measures an average of request intervals ΔTr. For example, the measurement unit 222 holds a reception date and time every time the reception unit 221 receives a data request from the application 110. After holding two consecutive reception dates and times, the measurement unit 222 calculates the request interval ΔTr based on a difference between the two reception dates and times. After calculating a plurality of request intervals ΔTr, the measurement unit 222 calculates an average of the request intervals ΔTr by dividing a total sum of the request intervals ΔTr by the number of request intervals ΔTr. After calculating the average of the request intervals ΔTr, the measurement unit 222 registers the average of the request intervals ΔTr in the management table.

The measurement unit 222 measures an average of update intervals ΔTs. For example, the measurement unit 222 holds a reception date and time every time the reception unit 221 receives position data from the second digital twin system 20. After holding two consecutive reception dates and times, the measurement unit 222 calculates the update interval ΔTs based on a difference between the two reception dates and times. After calculating a plurality of update intervals ΔTs, the measurement unit 222 calculates the average of the update intervals ΔTs by dividing a total sum of the update intervals ΔTs by the number of the update intervals ΔTs. After calculating the average of the update intervals ΔTs, the measurement unit 222 registers the average of the update intervals ΔTs in the management table.

Based on a relationship between the average of the request intervals ΔTr and the average of the update intervals ΔTs registered in the management table, the switching unit 223 performs switching between the each-time reading mode and the pre-reading mode. For example, when the average of the request intervals ΔTr is larger than twice the average of the update intervals ΔTs, the switching unit 223 registers the each-time reading mode in the item of the reading mode. When the average of the request intervals ΔTr is equal to or smaller than twice the average of the update intervals ΔTs, the switching unit 223 registers the pre-reading mode in the item of the reading mode. As described above, based on the relationship between the average of the request intervals ΔTr and the average of the update intervals ΔTs registered in the management table, the connector 200 may adaptively select the reading mode of the position data.

Based on the reading mode registered in the management table, the reading unit 224 reads position data from the second digital twin system 20. For example, in a case where the pre-reading mode is registered, the reading unit 224 first reads position data from the second digital twin system 20 before the reception unit 221 receives a data request from the application 110, and stores the position data in the data storage unit 211 (see also FIG. 6). For example, before the reception unit 221 receives a data request from the application 110, the position data is prepared in the data storage unit 211.

As described above, before the data request is received, the connector 200 may prepare to respond the position data. Accordingly, when the connector 200 receives the data request, it is possible to respond the position data to the application 110 in a short time as compared with a case where there is no preparation. Although details will be described later, in a case where the each-time reading mode is registered in the management table, the reading unit 224 reads position data from the second digital twin system 20 every time the reception unit 221 receives a data request from the application 110. After reading the position data, the reading unit 224 outputs the position data to the transmission unit 225 without storing the position data in the data storage unit 211. Accordingly, it is possible to suppress a reduction in the storable capacity of the data storage unit 211. For example, it is possible to suppress resource shortage of the data storage unit 211.

The transmission unit 225 transmits subscription registration of the position data to the second digital twin system 20 at a predetermined timing. For example, the transmission unit 225 transmits the subscription registration of the position data to the second digital twin system 20 at a timing immediately after the operation of the data linking system ST. At a timing when the switching unit 223 performs switching from the each-time reading mode to the pre-reading mode, the transmission unit 225 may transmit the subscription registration of the position data to the second digital twin system 20. Accordingly, the position data is responded from the second digital twin system 20 every time the second digital twin system 20 is updated.

The transmission unit 225 transmits the position data to the application 110. Accordingly, the position data is responded from the connector 200 to the application 110. For example, when the each-time reading mode is registered in the management table, the transmission unit 225 transmits the position data output from the reading unit 224 to the application 110. When the pre-reading mode is registered in the management table, the transmission unit 225 acquires the position data stored in the data storage unit 211 and transmits the position data to the application 110.

An operation of the connector 200 will be described with reference to FIGS. 7A and 8.

Figure 7A:
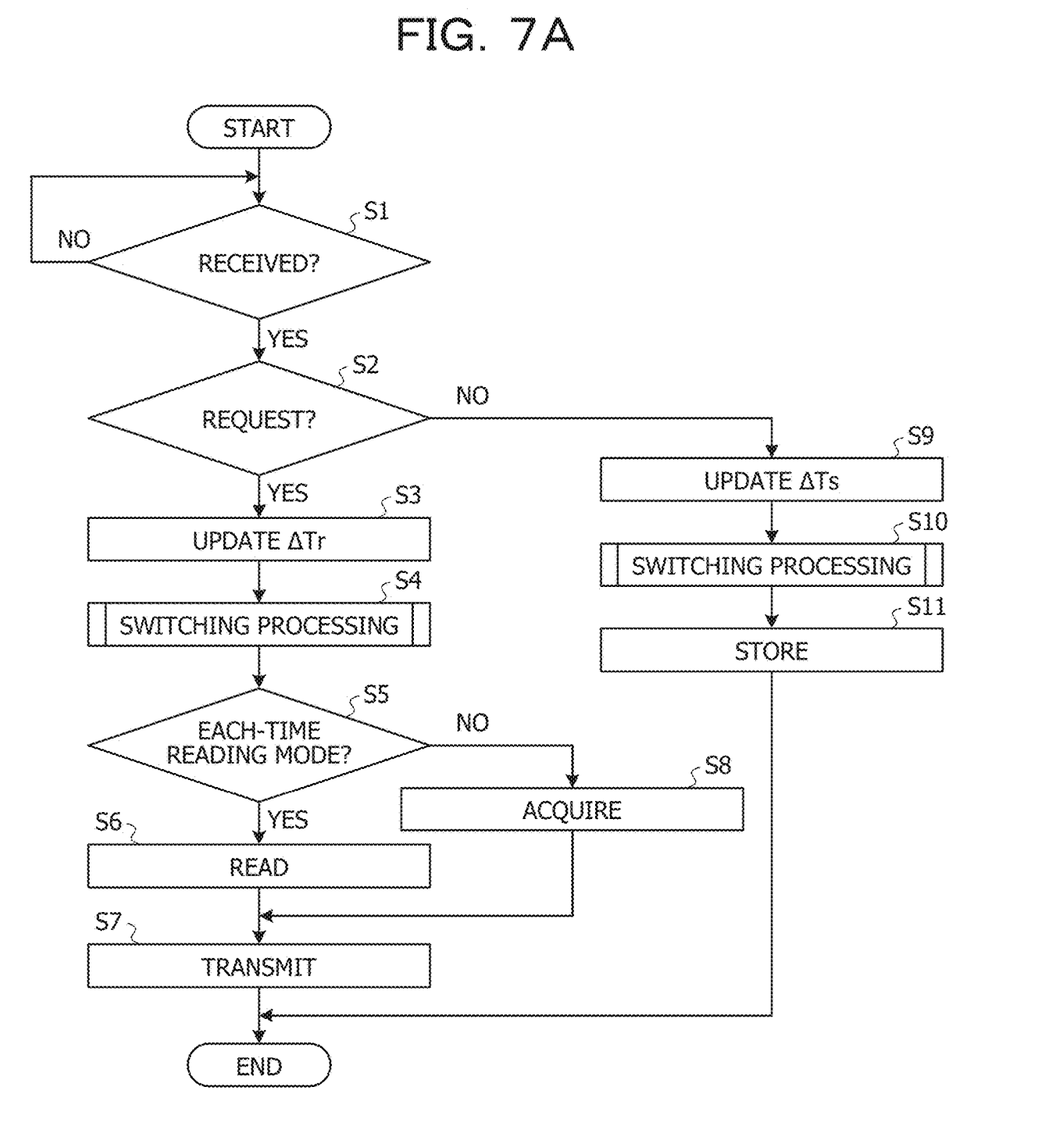
FIG. 7A is a flowchart illustrating an example of processing executed by the connector and FIG. 7B is a flowchart illustrating an example of switching processing.
Figure 8:
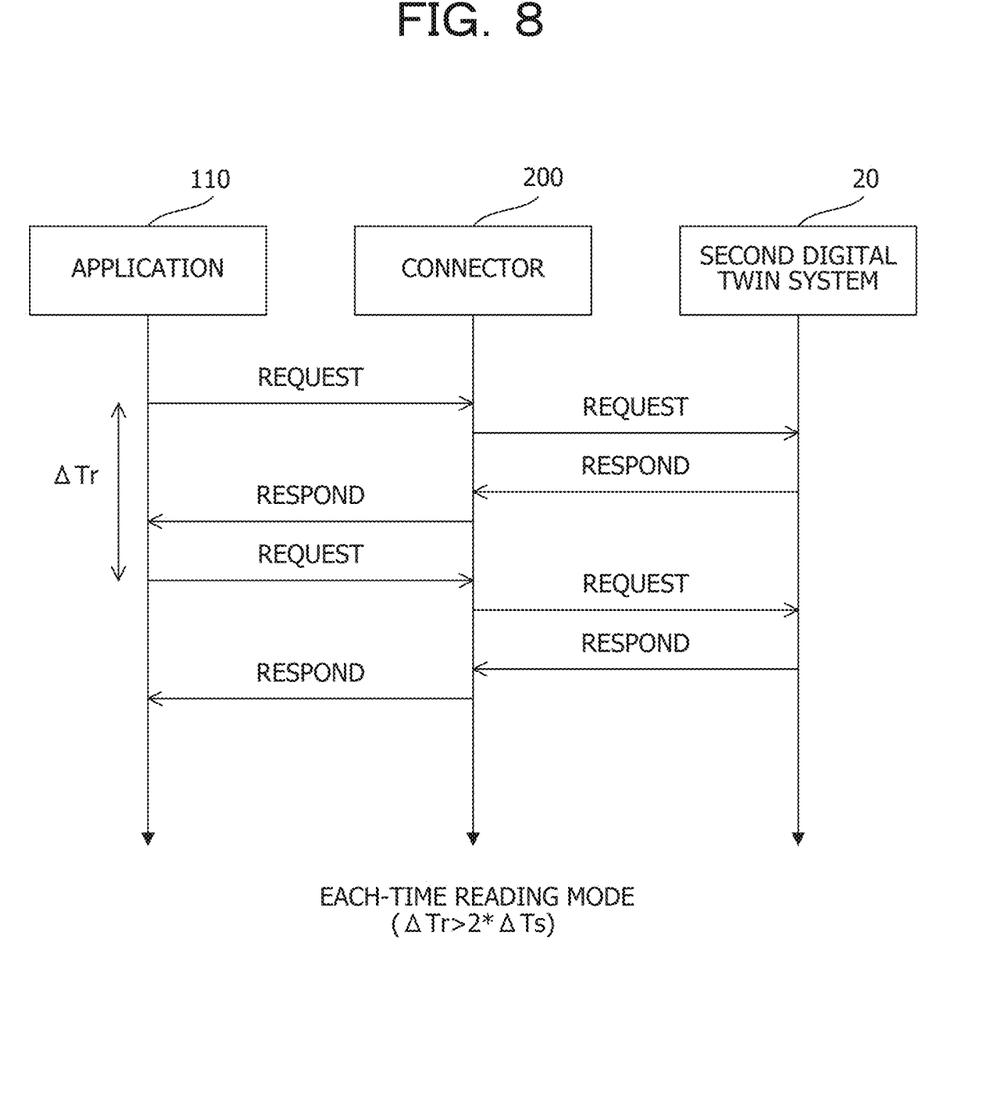
FIG. 8 is an example of a processing sequence diagram in an each-time reading mode.

First, as illustrated in FIG. 7A, the reception unit 221 waits until one of a data request and position data is received (step S1: NO). For example, the reception unit 221 waits until a data request is received from the application 110 or position data is received from the second digital twin system 20. When one of the data request and the position data is received (step S1: YES), the reception unit 221 determines whether the data request is received (step S2).

When the reception unit 221 receives the data request (step S2: YES), the measurement unit 222 updates the request interval ΔTr (step S3). For example, the measurement unit 222 calculates an average of the request intervals ΔTr, and based on the average of the request intervals ΔTr, updates the average of the request intervals ΔTr registered in the management table. After the measurement unit 222 updates the request interval ΔTr, the switching unit 223 executes switching processing (step S4). Although details will be described later, the switching processing is processing of switching the reading mode. By executing the switching processing, the switching unit 223 performs switching between the each-time reading mode and the pre-reading mode.

After executing the switching processing, the switching unit 223 determines whether the reading mode is the each-time reading mode (step S5). When the reading mode is the each-time reading mode (step S5: YES), the reading unit 224 reads position data (step S6). For example, as illustrated in FIG. 8, when the reading unit 224 performs reading of position data on the second digital twin system 20, the second digital twin system 20 transmits the position data to respond the position data to the reception unit 221. Accordingly, the reception unit 221 receives the position data.

After the reception unit 221 receives the position data, the transmission unit 225 transmits the position data to the application 110 (step S7) and ends the processing. For example, when the reception unit 221 receives the position data, the position data is output to the transmission unit 225 without being stored in the data storage unit 211. Accordingly, the transmission unit 225 transmits the position data to the application 110, and ends the processing. For example, as illustrated in FIG. 8, the connector 200 responds the position data to the application 110. Because the reception unit 221 does not store the position data in the data storage unit 211, an increase in the data amount of the position data in the data storage unit 211 is avoided. Accordingly, a decrease in the storable capacity is suppressed.

By contrast, in the processing in step S5, when the reading mode is not the each-time reading mode (step S5: NO), since the reading mode is a pre-reading mode, the transmission unit 225 acquires position data from the data storage unit 211 (step S8). After acquiring the position data, the transmission unit 225 executes the processing in step S7 and transmits the position data to the application 110. After the transmission unit 225 transmits the position data, by deleting the transmitted position data remaining in the data storage unit 211, unnecessary consumption of the storable capacity of the data storage unit 211 may be avoided.

In the processing of step S2, in a case where the reception unit 221 does not receive the data request, the reception unit 221 determines that the position data is received (step S2: NO), and the measurement unit 222 updates the update interval ΔTs (step S9). For example, the measurement unit 222 calculates an average of the update intervals ΔTs, and based on the average of the update intervals ΔTs, updates the average of the update intervals ΔTs registered in the management table. After the measurement unit 222 updates the update interval ΔTs, the switching unit 223 executes the switching processing (step S10).

After the switching processing is executed, the reception unit 221 stores the position data in the data storage unit 211 (step S11) and ends the processing. As described above, in a case where the reception unit 221 receives the position data instead of the data request, the reception unit 221 stores the position data in the data storage unit 211. Accordingly, when the reception unit 221 receives the data request from the application 110, the transmission unit 225 may acquire the position data from the data storage unit 211 and quickly transmit the position data. For example, the transmission unit 225 may transmit the position data in a shorter time than a time in which the reading unit 224 reads the position data from the second digital twin system 20 and the transmission unit 225 transmits the position data to the application 110.

Details of the above-described switching processing will be described with reference to FIGS. 7B, 9, and 10.

Figure 7B:
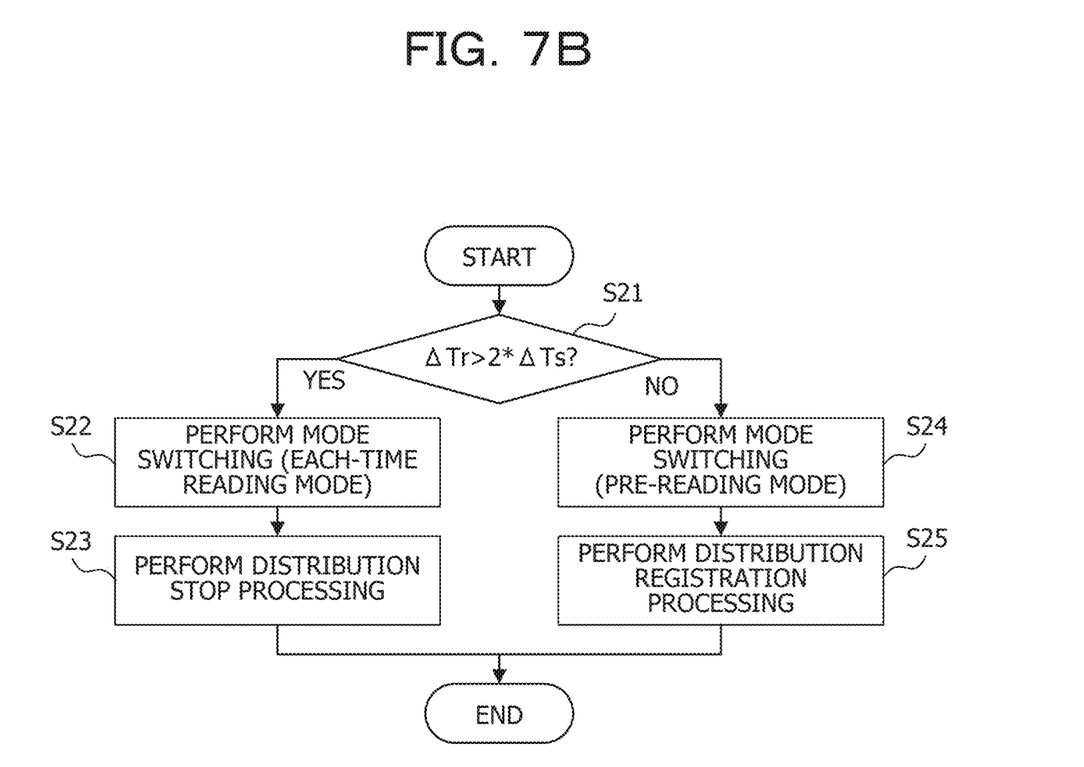

As illustrated in FIG. 7B, when the switching processing is started, the switching unit 223 determines whether the average of the request intervals ΔTr is larger than twice the average of the update intervals ΔTs (step S21). When the average of the request intervals ΔTr is larger than twice the average of the update intervals ΔTs (step S21: YES), the switching unit 223 performs mode switching to the each-time reading mode (step S22). After the mode switching to the each-time reading mode is performed, the switching unit 223 performs distribution stop processing (step S23) and ends the switching processing.

Figure 9:
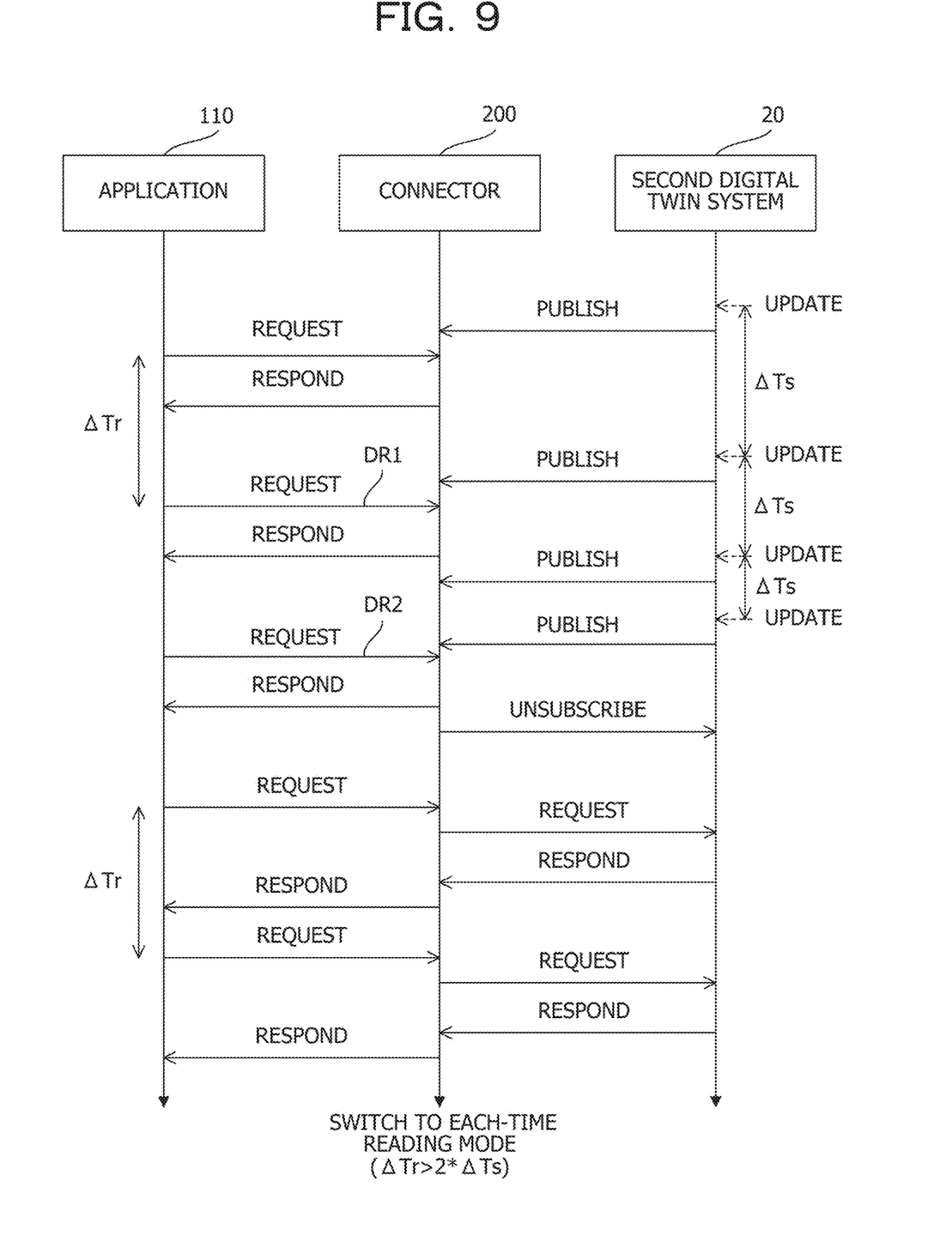
FIG. 9 is an example of a processing sequence diagram representing switching from the pre-reading mode to the each-time reading mode.

For example, as illustrated in FIG. 9, there is a case where the operation is performed in the pre-reading mode because the average of the request intervals ΔTr is equal to or smaller than twice the average of the update intervals ΔTs. In such a case, the update interval ΔTs of the second digital twin system 20 may be gradually shortened due to improvement of a communication environment, a reduction of the data amount of the position data, or the like. As a result, when there is no change in the request interval ΔTr, there is a possibility that the average of the request intervals ΔTr is larger than twice the average of the update intervals ΔTs.

As a result of the update interval ΔTs being gradually shortened, the position data may be consecutively responded from the second digital twin system 20 to the connector 200 during a period from a data request DR1 to a data request DR2. When the connector 200 continues to hold these pieces of received position data until the data request DR2 is received, the connector 200 may unnecessarily consume the storable capacity.

In such a case, the switching unit 223 performs switching from the pre-reading mode to the each-time reading mode, and performs the distribution stop processing on the second digital twin system 20. Accordingly, after the distribution stop processing, the provision of the position data from the second digital twin system 20 is stopped. As a result, every time the connector 200 reads the position data from the second digital twin system 20, the second digital twin system 20 responds the position data to the connector 200. Accordingly, unnecessary consumption of the storable capacity of the connector 200 is suppressed.

As illustrated in FIG. 7B, when the average of the request intervals ΔTr is equal to or smaller than twice the average of the update intervals ΔTs (step S21: NO), the switching unit 223 performs the mode switching to the pre-reading mode (step S24). After the mode switching to the pre-reading mode is performed, the switching unit 223 performs subscription registration processing (step S25) and ends the switching processing.

Figure 10:
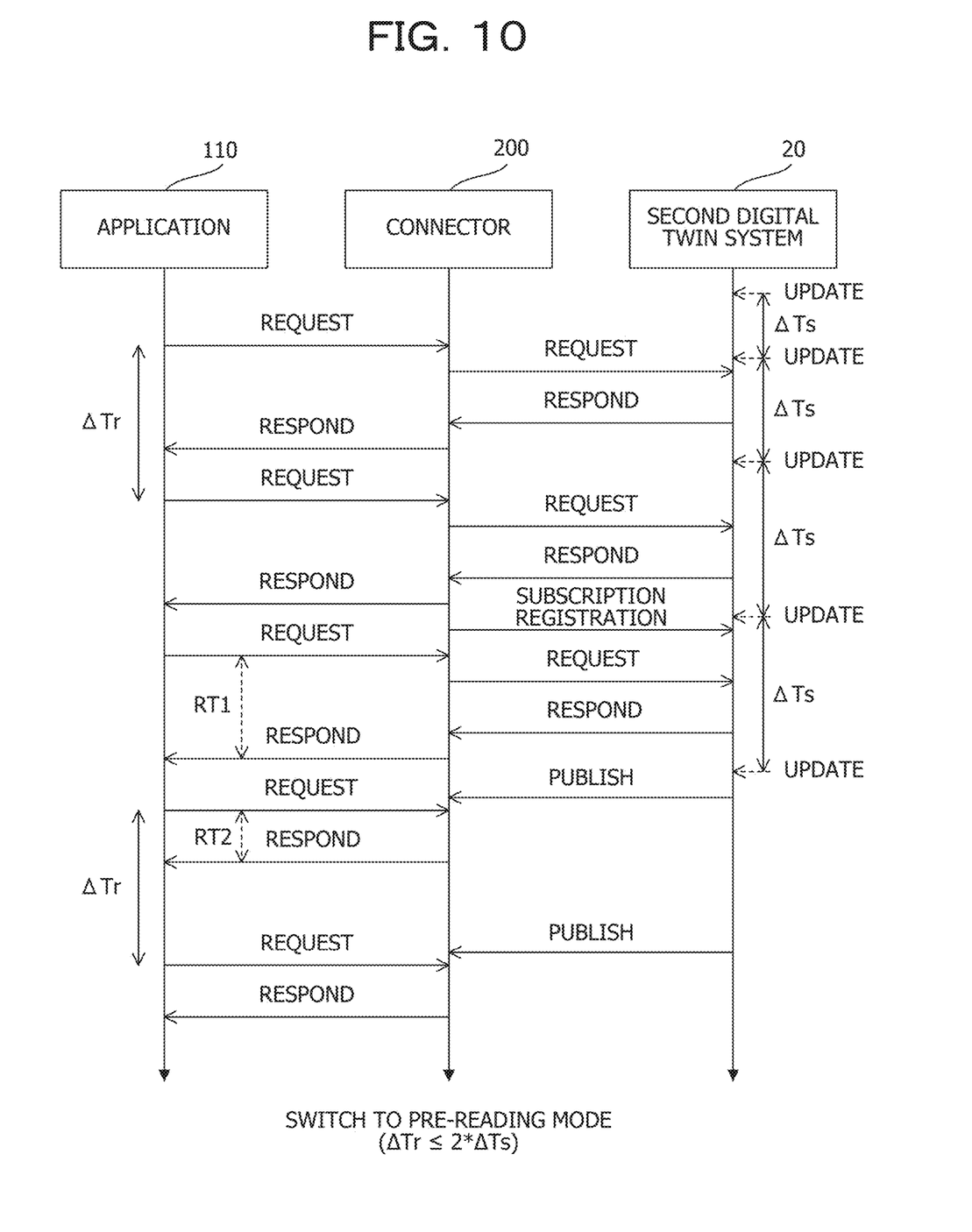
FIG. 10 is an example of a processing sequence diagram representing switching from the each-time reading mode to the pre-reading mode.

For example, as illustrated in FIG. 10, there is a case where the operation is performed in the each-time reading mode because the average of the request intervals ΔTr is larger than twice the average of the update intervals ΔTs. In such a case, the update interval ΔTs of the second digital twin system 20 may gradually increase due to deterioration of a communication environment, an increase in the data amount of the position data, or the like. As a result, when there is no change in the request interval ΔTr, there is a possibility that the average of the request intervals ΔTr is equal to or smaller than twice the average of the update intervals ΔTs.

In such a case, the switching unit 223 performs switching from the each-time reading mode to the pre-reading mode, and performs the subscription registration processing on the second digital twin system 20. Accordingly, after the subscription registration processing, provision of the position data from the second digital twin system 20 is started. As a result, the connector 200 periodically receives the position data from the second digital twin system 20.

At the time of receiving the data request from the application 110, the position data is prepared in the connector 200 in advance. For this reason, the connector 200 may respond the application 110 with the position data in a response time RT2 shorter than a response time RT1 when operated in the each-time reading mode. As described above, when the switching from the each-time reading mode to the pre-reading mode is performed, the connector 200 may respond the position data in a short time in response to the data request from the application 110.

As described above, according to the present embodiment, the connector 200 disposed as a computer between the application 110 belonging to the same first group G1 as the first digital twin system 10 and the second digital twin system 20 belonging to the second group G2 different from the first digital twin system 10 executes data linking between the first digital twin system 10 and the second digital twin system 20.

Based on the relationship between the request interval ΔTr at which the application 110 requests data from the connector 200 and the update interval ΔTs of the second digital twin system 20 that serves as the reading destination of the data by the connector 200, the connector 200 performs switching between the each-time reading mode and the pre-reading mode. Accordingly, the data reading mode may be adaptively selected. For example, the connector 200 performs switching between the each-time reading mode and the pre-reading mode based on the relationship between the average of the request intervals ΔTr and the average of the update intervals ΔTs, thereby improving the accuracy of the switching.

Although the preferred embodiment of the present disclosure has been described in detail above, the present disclosure is not limited to the specific embodiment according to the present disclosure, and various modifications and changes may be made within a scope of the gist of the present disclosure described in the claims.

For example, when the connector 200 is operated in the each-time reading mode, it is difficult to measure the update interval ΔTs based on the periodic distribution of the position data. For this reason, in a case where the connector 200 is operated in the each-time reading mode, the connector 200 may perform another short-term subscription registration processing of measuring the update interval ΔTs to the second digital twin system 20. When the different subscription registration processing is performed, the second digital twin system 20 may periodically or non-periodically notify the connector 200 of the update of the second digital twin system 20, for example. Accordingly, even when the connector 200 is operated in the each-time reading mode, the connector 200 may measure the update interval ΔTs.

The following appendices will be further disclosed in association with the above description.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data linking method, between a first digital twin system and a second digital twin system, to be executed by a connector disposed as a computer between an application program that belongs to a same group as the first digital twin system and the second digital twin system that belongs to a group different from the first digital twin system, the data linking method comprising:

performing switching between a first reading mode and a second reading mode based on a relationship between a request interval at which the application program requests data from the connector and an update interval of the second digital twin system that serves as a reading destination of the data by the connector, the first reading mode being a mode in which the connector loads the data from the second digital twin system each time the application program requests the data, the second reading mode being a mode in which the connector preload the data from the second digital twin system before the application program requests the data.

2. The data linking method according to claim 1, wherein the connector calculates an average of the request intervals based on a history of the request interval, calculates an average of the update intervals based on a history of the update interval, and performs the switching between the first reading mode and the second reading mode based on a relationship between the average of the request intervals and the average of the update intervals.

3. The data linking method according to claim 1, wherein the connector selects the first reading mode in a case where the request interval is larger than a coefficient multiple of the update interval.

4. The data linking method according to claim 1, wherein the connector selects the second reading mode in a case where the request interval is smaller than a coefficient multiple of the update interval.

5. The data linking method according to claim 3, wherein the coefficient multiple is larger than once and equal to or smaller than twice.

6. The data linking method according to claim 1, wherein the application program acquires, via the connector, data managed by the second digital twin system, executes predetermined processing based on the acquired data, and stores an execution result in the first digital twin system.

7. A non-transitory computer-readable recording medium storing a data linking program, between a first digital twin system and a second digital twin system, to be executed by a connector disposed as a computer between an application program that belongs to a same group as the first digital twin system and the second digital twin system that belongs to a group different from the first digital twin system, the data linking program comprising:

performing switching between a first reading mode and a second reading mode based on a relationship between a request interval at which the application program requests data from the connector and an update interval of the second digital twin system that serves as a reading destination of the data by the connector, the first reading mode being a mode in which the connector loads the data from the second digital twin system each time the application program requests the data, the second reading mode being a mode in which the connector preload the data from the second digital twin system before the application program requests the data.

* * * * *